June 4, 1957  R. A. BRODING ET AL  2,794,951
DYNAMIC CABLE MEASURING SYSTEM
Filed Aug. 27, 1953  3 Sheets-Sheet 1

ROBERT A. BRODING
WALLACE B. ALLEN
INVENTOR.

BY D. Carl Richards
ATTORNEY

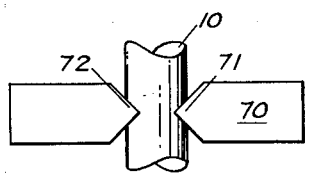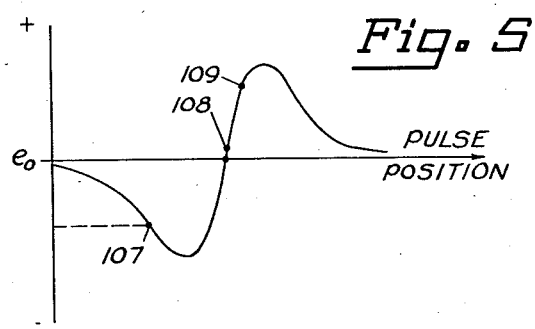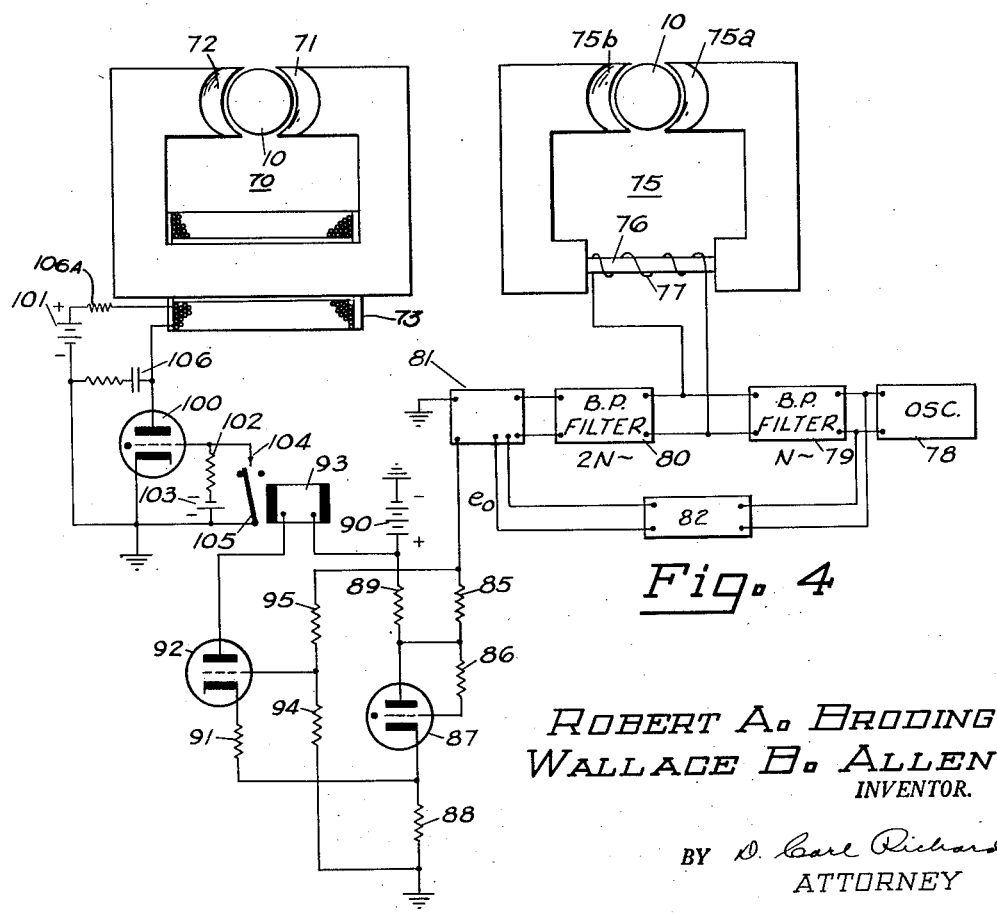

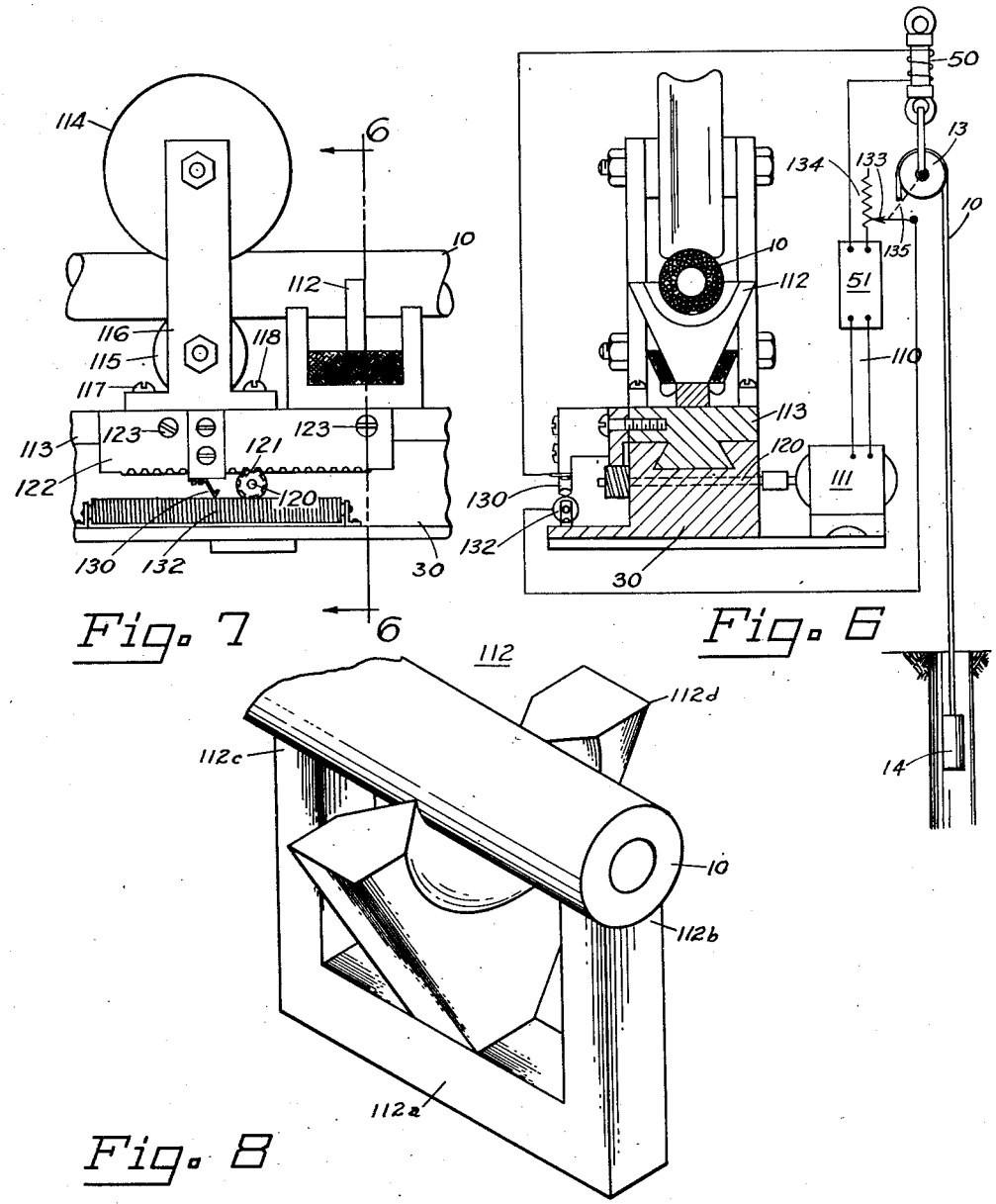

United States Patent Office 2,794,951
Patented June 4, 1957

2,794,951

DYNAMIC CABLE MEASURING SYSTEM

Robert A. Broding, Tulsa, Okla., and Wallace B. Allen, Dallas, Tex., assignors, by mesne assignments, to Socony Mobil Oil Company, Inc., a corporation of New York Application August 27, 1953, Serial No. 376,925

8 Claims. (Cl. 324—34)

This invention relates to well logging type operations and more particularly to a system for accurately determining the depth of a cable-supported bore hole tool.

In the extensively developed well logging and completing arts, accurate depth measurements of horizons which are either productive or which give rise to anomalous variations in well logs must be made in order to coordinate activities relating to completion and production of petroleum bearing formations as well as to coordinate exploration procedures. Generally, a stranded steel cable encasing electrical conductors is lowered into the bore hole to support a sensing or operating instrument at the end thereof. The instrument is moved through the bore hole thereby to be positioned adjacent successive layers of the earth structure. As greater and greater depths are reached with the well instrument, the tensile forces on the cable are correspondingly increased, so that the actual depth of the instrument is different than the depth apparent from measurements ordinarily made at the surface. Logging to depths of 10,000 feet may produce cable elongations in the order of ten feet or more.

In the past, the depth of a cable-supported tool has been measured principally by passing the cable over a measuring sheave which is coupled mechanically or electromechanically to the drive mechanism of a counter or a chart recording means. In well logging, a sensed parameter may thus be recorded as a function of bore hole depth. No attempt has been made to compensate for actual variations in cable length due to dynamic forces on the cable and the supported well tool as it is moved along the bore hole.

In accordance with the present invention a well logging cable is measured for accurately determining the depth of a well tool supported thereby under dynamic conditions through the steps of generating a distinctive localized condition on the cable at a first point near the mouth of the bore hole and detecting the localized condition at a second point spaced from the first point in the direction of travel of the cable. In response to the detection of each localized condition of the second point a succeeding localized condition is impressed on the cable at a first point thereby to place on the cable a series of uniformly spaced apart indices. Responsive to the dynamic variations in the tension on the cable the distance between the points of impression and detection of the localized condition is varied in proportion to the instantaneous values in the tension of the cable whereby the number of localized conditions detected at the second point is a direct measure of the total length of the cable in the bore hole.

For a more complete understanding of the invention and for further objects and advantages thereof, reference may now be had to the following description taken in conjunction with the accompanying drawings in which:

Fig. 1 diagrammatically illustrates measurement of cable length;

Fig. 3 is a top view of the magnetic structures shown in Fig. 4;

Fig. 4 is a further modification of the sensing system;

Fig. 5 is a plot of the control voltage utilized in the system of Fig. 4;

Figures 1, 2:
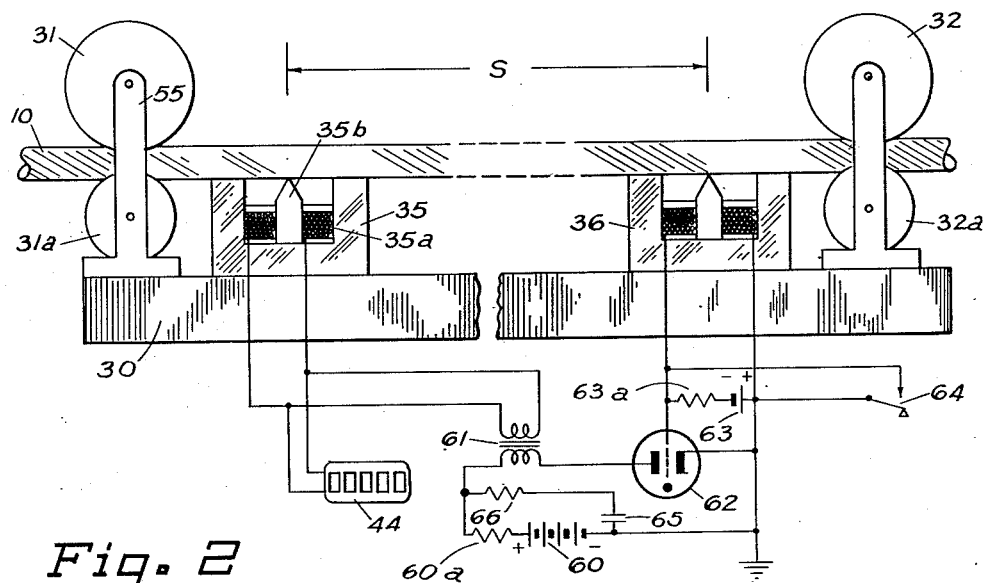
Fig. 2 illustrates the sensing system in greater detail.

Fig. 6, shown partially in a section taken along the lines 6—6 of Fig. 7, illustrates automatic control of the distance between the sensing units;

Fig. 7 is a side view of the system of Fig. 6; and

Fig. 8 is an isometric view of the magnetic head of Figs. 6 and 7.

Referring to Fig. 1, a cable 10 stored on a reel 11 is threaded over pulleys 12 and 13 to support a bore hole tool 14 for travel through bore hole 15. For the purpose of the present description, it will be assumed that bore hole tool 14 comprises a logging instrument from which an output signal, passing through slip-rings 16 associated with reel 11 and applied to an amplifying or detecting system 17, actuates a recording element 18 of recorder 19 to appear as a variable trace 20. It is desirable to know the depth of the instrument 14 to within a minimum error, for example, one foot, at any point in the bore hole 15 so that variations in trace 20 may be accurately and reliably associated with a particular depth below the earth's surface.

In accordance with many prior art systems, the coupling 21, diagrammatically shown as a dotted line, between the measuring pulley 12 and the drive input 22 of the recorder 19 was relied upon to drive the recording chart in direct proportion to the depth of the instrument 14 in the bore hole. The trace 20 thereby automatically is plotted with reference to a depth controlled scale. However, variations in the static tension on cable 10 due to the weight of different lengths of the cable in the bore hole produce elongations therein and consequent variations in the depth of the instrument 14. The depth scale as conventionally obtained, therefore is not accurate. The tensile forces on the cable are varied by the viscous drag of the cable 10 and instrument 14 through liquid filled bore holes and along the bore hole walls so that there is no simple relationship between depth and length of cable payed into a bore hole.

In accordance with the present invention the cable is measured at a measuring station under actual load conditions and markers are impressed on the cable at a plurality of points spaced selected and controlled distances along the length of the cable. The number of such points is counted as the instrument 14 is lowered into the bore hole. Preferably, new markers are impressed and counted as the instrument is removed from the bore hole.

More particularly, a scaling bar or rod 30 is supported by pulleys 31 and 32 adjacent cable 10. The position of the rod 30 is substantially fixed by means of anchoring links 33 and 33a coupled to the structure supporting reel 11 or in some other convenient manner such that rod 30 may freely follow cable 10 laterally as it is unwound from reel 11. A magnetic recording head 35 and a magnetic reproducer 36 are mounted on the rod 30 adjacent opposite ends in a manner later to be described. An electrical feed back loop is connected between detector 36 and recorder 35 comprised of channel 37, pulser 38 and channel 39.

Operation of the system thus far described is as follows. With the bore hole instrument 14 positioned as shown in Fig. 1, i. e., at a reference datum such as at the surface of the earth, the recording head 35 is energized as by an electrical pulse to magnetize a minute segment of cable 10. Thereafter the cable 10 is unwound from reel 11 lowering instrument 14 into the bore hole. As the magnetized cable section passes the detecting head 36, a signal is generated which is transmitted to the pulser 38 whose output is then applied by way of channel 39 to the recording head to magnetize a second minute segment of the cable 10. Thus as the cable continues to travel into the bore hole, spaced points on the cable are magnetized, the spacings being exactly equal to the distance between the recording head 35 and the reproducing head 36.

At the same time the output of pulser 38 is transmitted by way of channel 43 to a depth counter 44 and also to the recorder 19. The counter 44 may total the number of pulses produced by the detector 36 to provide at any time a ready index to the depth of instrument 14. At the same time and in the manner well known by those skilled in the art, scale and depth markers may be impressed on the recording chart in conjunction with trace 20 to provide a depth scale therefor. Such depth markers may be printed or recorded by the photographic flash method often employed in well logging cameras or otherwise. As here illustrated, the lines 45 on the recorder chart, representative of such depth markers, are spaced in proportion to the actual length of the segment of the cable 10 between two adjacent magnetized segments thereof while under tension.

The bar 30 preferably is made of material insensitive to temperature variations. One such material is identified by the trade name Invar. Alternatively, the rod 30 may comprise several sections of contrasting but mutually compensating temperature coefficients and of relative lengths dependent upon the differences in the temperature coefficients so that for any condition encountered, the spacing between recording and detecting heads 35 and 36 will be independent of temperature.

In a further aspect of the invention as will later be described in connection with Figs. 6 and 7, the weight of the cable in the bore hole as sensed by a strain gauge or similar device 50 coupled between a supporting structure and the pulley 13, Fig. 1, may be made to control the spacing between the transducers 35 and 36 through a translating unit 51. Such action automatically corrects depth measurements for dynamic cable elongation, correcting always to a "static stretch" reference value.

Referring now to Fig. 2 where like parts have been given the same reference characters as in Fig. 1, cable 10 is fed between two pairs of guide rollers 31, 31a, and 32, 32a which are secured to opposite ends of the rod 30 to maintain a fixed relation between rod 30 and cable 10.

The recording head 35 is mounted on bar 30 closely adjacent the pulleys 31 and 31a and comprises an E-shaped laminated core structure having the end sections which are in close proximity to cable 10. A coil 35a encircles the central core member 25b. Core member 35b has a pointed or chisel shaped extremity so that it covers or is adjacent an extremely limited segment of the length of cable 10. Transducer 36, similar in construction to transducer 35, is positioned adjacent the other end of bar 30 with the magnetic structure also in close proximity to cable 10. The spacing S between transducers 35 and 36 will be selected as to lend greatest convenience in utilizing resultant data; for example, a 10 foot spacing is suitable.

One manner of energizing the magnetizing system is shown in Fig. 2. A source such as a battery 60 is connected at its positive terminal by way of resistor 60a to the primary winding of a transformer 61 and then to the anode of a gas discharge tube such as a thyratron 62. The negative terminal on battery 60 is connected to ground and to the cathode of the thyratron 62. A biasing battery 63 or its equivalent is connected from the cathode through resistor 63a to the grid of tube 62 and thus normally maintains tube 62 non-conductive. A switch 64 is provided for momentarily shorting the grid of tube 62 to ground so as to fire tube 62 and thereby momentarily energize transducer 35. When transducer 35 is energized the adjacent segment of cable 10 is magnetically marked.

A circuit including a condenser 65 connected in series with a resistor 66 between anode and cathode of tube 62 controls the length of time tube 62 is conducting. By suitably selecting the time constant for circuit 65, 66, the output of tube 62 as it appears in the secondary winding of transformer 61 may be made to be an extremely short high potential pulse. Thus, with the instrument 14 initially positioned as shown in Fig. 1, switch 64, Fig. 2, will be closed to mark a segment of cable 10. The point of maximum magnetic flux will be immediately adjacent the tip of the central member 35b of transducer 35. Thereafter, as the magnetized portion of the cable moves past the detecting head 36, a voltage is generated in detector 36 which is applied to the grid of tube 62. The battery 63 is so selected as to prevent firing of tube 62 except at the crest of the voltage from transducer 36. Tube 62 thus fires when the portion of the cable initially adjacent the tip of the central member 35b is similarly positioned with respect to transducer 36. Tube 62 is fired to similarly magnetize a succeeding segment of cable 10 and tube 62 is imediately extinguished by discharge in the condenser-resistor circuit 65, 66.

The pulse appearing in the secondary winding of transformer 61 and applied to the coil 35a may also be utilized to energize counter 44 and other associated mechanisms. So long as the velocity or the speed of the cable is maintained within fairly restricted limits, a fixed relationship between voltage required of battery 63 and the voltage generated by transducer 36 may be relied upon to control magnetization of the cable at points spaced an accurately controlled distance apart. If desired the magnitude of the voltage on the grid of tube 62 may be varied in proportion to the speed of the cable 10 automatically to control the relationship between the voltage generated in the detecting head and the firing potential of tube 62. In order to maintain the desired accuracy, i. e., to know the depth of the bore hole instrument to within one foot, and assuming operations to depths of 10,000 feet, the magnetization of cable 10 and the detection of the magnetized portion preferably should be accurate to within an average of .01 inch.

It will be noted that in Fig. 2 the system provides longitudinal magnetization of the cable segments. In Figs. 3 and 4 a system is illustrated in which transverse magnetization is utilized together with a flux gate detecting system whereby the measurement may be made independent of the speed at which the cable is lowered into the bore hole. Referring first to Fig. 3, it will be seen that, viewed from the top, a magnetic core 70 having pointed pole pieces 71 and 72 is positioned adjacent the cable 10. Referring to Fig. 4, the magnetic core 70 is a C-shaped structure preferably built up of laminations of high quality magnetic material. A coil 73 is wound around the core structure 70 which, when energized, produces a highly concentrated magnetic field between the points 71 and 72 adjacent the cable 10.

The detecting transducer 75 is similar in construction except that a portion of the magnetic path is formed by a saturable filament 76 about which a coil 77 is disposed. The coil 77 is excited from an oscillator 78 whose output is fed through a band pass filter 79 whereby the fundamental of the oscillator output (at N cycles per second) excites coil 77. As is well understood by those skilled in the art, variations in the flux in filament 76 by reason of an external field, such as the passage of a magnetized portion of cable 10 in the air gap between pole pieces 75a and 75b produces a second harmonic output voltage (2N cycles per second) which may then be utilized for analysis of the flux field or for the operation of associated instruments. The second harmonic component is selectively passed by band pass filter 80 to a phase comparator 81. The voltage at the output of filter 80 is compared with the output of the frequency multiplier 82 to produce an output voltage $e_o$.

The output voltage $e_o$ from circuit 81 has been illustrated in Fig. 5 and is representative of the voltage produced upon passage of a magnetized portion of cable 10 by transducer 75. The voltage, initially zero, increases in a negative direction and then abruptly passes through zero to a high positive value and then approaches zero again.

The circuit interconnecting amplifier 81 and coil 73 utilizes the voltage $e_0$ to selectively magnetize succeeding portions of cable 10 by energization of coil 73. More particularly, the output voltage $e_0$ is applied by way of resistors 85 and 86 to the control grid of a gas discharge device 87, such as a thyratron. The cathode of tube 87 is connected by way of resistor 88 to ground and the anode is connected by way of resistor 89 to the positive terminal of a suitable B supply, such as battery 90 whose negative terminal is connected to ground. The cathode of tube 87 is connected by way of resistor 91 to the cathode of a vacuum triode 92. The anode of triode 92 is connected by way of a relay coil 93 to the positive terminal of battery 90. The control grid of triode 92 is connected by way of resistor 94 to ground and by way of resistor 95 to the output of circuit 81. The relay actuated by coil 93 controls conduction in a second thyratron 100. Thyratron 100 has its cathode connected to ground and its anode connected by way of coil 73 and resistor 106A to the positive terminal of a plate supply such as battery 101 whose negative terminal is connected to ground. The control grid of thyratron 100 is connected to cathode by way of a resistance 102 and a biasing battery 103. The relay contact 104 and its associated relay armature 105 are connected respectively to the grid and cathode of the thyratron 100 so that upon energization of relay coil 93 the armature 105 momentarily shorts the grid of tube 100 firing the latter tube and energizing coil 73. The discharge of condenser 106 immediately extinguishes tube 100, thereby placing it in condition for a succeeding pulsing operation.

In operation the positive potential normally on the grid of tube 87 maintains it normally conductive so that the voltage produced across resistor 88 is effective as between grid and cathode of tube 92 to maintain tube 92 normally nonconductive. When the output voltage $e_0$ is driven negative and approaches a predetermined point, for example the voltage at point 107, the anode voltage on thyratron 87 is decreased to such a value that de-ionization takes place rendering tube 87 non-conductive. Tube 87 will not again conduct until its grid is permitted to go positive. When tube 87 is cut off, the voltage across resistor 88 is substantially zero so that tube 92 may be made to conduct if a positive voltage is applied to its grid. The negative portion of the output voltage $e_0$ then decreases rapidly as the magnetized portion of cable 10 comes into registration with the points 75a and 75b and then goes positive so that at point 108 tube 92 begins to conduct, energizing relay coil 93 to actuate the associated armature 105. As the voltage $e_0$ becomes more positive, the grid of tube 87 becomes positive and at point 109 or thereabouts tube 87 begins to conduct, thus de-energizing tube 92. In the meantime, armature 105 has shorted the grid of tube 100 initiating conduction therein to energize coil 73 and thus magnetize a segment of cable 10.

Since detector 75 is a flux gate device, the voltage $e_0$ will be reproduced independently of speed of the cable so that a well exploring instrument or tool could be stopped at any selected depth regardless of the location of magnetized portions of the cable with respect to the detecting heads.

Referring to Figs. 6 and 7, there is illustrated the provision of means by which the distance between the recording and detecting heads is varied only upon dynamic variations in the tension of the cable on the measuring sheave 13 and by which the carriage 113 will remain in a fixed position with respect to its supporting means for all static cable loads irrespective of the amount of cable payed into the bore hole.

As best seen in Fig. 6, a translating device 51 produces a voltage in its output circuit 110 for operation of a motor 111. Motor 111 is supported from rod 30 and is mechanically coupled as to produce relative movement between the magnetic head 112 and the spacing rod 30. Such relative movement is permitted by mounting the magnetic head 112 on a frame or carriage 113 which in turn is mounted in a dovetail slideway provided in the upper surface of the bar 30. As best seen in Fig. 7, cable positioning rollers 114 and 115 with their mounting bracket 116 are supported as by screws 117 and 118 to the carriage 113. Motor 111 drives shaft 120 which extends through the bar 30. A worm gear 121 is mounted on shaft 120 and is positioned in cooperative engagement with a rack 122. The rack 122 is secured to the carriage 113 as by screws 123.

The control voltage from translating device 51 is produced in response to variations in resistance in its input circuit. The input circuit for device 51 includes a series network comprising the strain gauge device 50 connected at one terminal to a friction contact 130 which in turn contacts a resistance 132. Resistance 132 is then connected to the variable tap 133 of a potentiometer 134. One terminal of potentiometer 134 is connected to one input terminal of translating device 51. The second terminal of the strain gauge device 50 is connected to the second input terminal of the translating device 51.

Thus in normal operation, increased loads on strain gauge device 50 produce an increased resistance in the input circuit of translating device 51. The rotation of sheave 13, proportional to increased static cable loads, drives tap 133 to decrease the portion of resistance 134 in the input circuit of translating device 51. The change in resistance from strain gauge 50 is equal and opposite the change in the portion of resistance 134 in the input circuit of translating device 51. By this means regardless of the static load on sheave 13 the position of carriage 113 is unchanged. If, however, during movement of the bore hole sensing means 14 viscous drag or dynamic forces as sensed by strain gauge 50 produce impedance changes not compensated by changes in resistance 134, motor 111 will then be excited to move the carriage 113 in proportion to such dynamic changes. Relative motion between slidewire 132 and its frictional contact 130 is thus controlled so that dynamic changes in the resistance of strain gauge 50 are nulled by concurrent changes in the portion of resistance 132 in the control circuit.

The input circuit of the translating device 51 is thus a self-balancing potentiometer system and allows the carriage 113 to change its position on bar 30 only upon dynamic variations in the force on strain gauge 50.

It will be apparent that the coupling 135 between sheave 13 and the variable tap 113 may include a suitable gear box or its equivalent to change the ratio of resistance change per foot of cable lowered into the bore hole and thus permit the use of a single resistance 134 regardless of the density of the drilling fluids encountered. Alternatively, for each bore hole to be studied, the resistance 134 may be selected in relation to the density of fluids in the bore hole to facilitate balance for static cable loads.

With the system thus described carriage 113 will be positioned at the same point on the supporting bar 30 whether the unit 14 be at 1,000, 5,000 or 10,000 foot depths. However the dynamic forces on the cable 10 and on the unit 14 may increase or reduce the tension on the cable with reference to the static value depending upon whether the unit 14 is being lowered or raised in the bore hole. If it reduces the tension on the cable 10, the motor 111 will then decrease the distance between the magnetic heads. If it increases the tension on cable 10, the distance is then increased. Thus even though there are dynamic variations in cable tension variations substantially different from static pull on the cable, the resultant stretch is compensated and highly accurate measurements of the depth of the exploring unit may then be made.

To further illustrate the problem it has been found that when logging as deep as 10,000 feet or more with one well logging system the static line load when the exploring unit was at hole bottom was at approximately 3500 pounds. If the exploring unit is lowered at a point near the hole bottom, the cable load was only approximately 2500 pounds. When the exploring unit was raised at the same level, the cable load was approximately 4500 pounds. Such variations actually produced a four foot error between measurements made while lowering and raising the exploring instrument. By the present invention such errors are removed and the depth of the exploring unit may be accurately known independent of a particular mode of operation.

Referring now to Fig. 8, the device 112 of Figs. 6 and 7 has been illustrated in an enlarged view better to show certain features of the recording-detecting head structure. A magnetic C-shaped core 112a is positioned with the projections 112b and 112c adjacent the cable 10. A central magnetic member 112d, generally of a V-shape, is mouted midway between projections 112b and 112c and extends upwardly to where it is closely adjacent the surface of cable 10. The opposed faces of the central member 112d are dished to form a knife edge. A coil, omitted from Fig. 8 but shown in Figs. 6 and 7, encircles member 112d. Upon excitation of the coil, magnetic flux is highly concentrated at the knife edge of element 112d and courses through the cable and into extensions 112b and 112c which present a substantial area abutting cable 10. Therefore the field at the knife edge is concentrated as to produce a concentrated, readily detectable magnetic indication on the cable proper. The knife edge extends along a substantial portion of the circumference of the cable 10 in contemplation of some twisting in the cable 10 as it travels from one detector to another.

While in the foregoing description reference has been made to operations in which magnetization of selected portions of a well cable have been utilized, it will be understood that different conditions other than magnetization may be controlled for the marking of the cable. A radioactive source and a suitable radiation detector could be employed. However, the magnetization of the cable is preferred inasmuch as possibly harmful radiation is not present and the cable in general is susceptible to magnetization such as to permit the foregoing operations.

As illustrated in Fig. 1, erasing heads 150 and 151 energized from a suitable source may be provided adjacent each end of the rod 30 to remove any signals previously impressed on cable 10. As the cable is fed into the bore hole, the eraser 150 would be energized to "clean" the cable prior to passing recording head 35. Similarly, as the cable is removed from the bore hole, eraser 151 would be excited.

If, absent compensation as discussed in connection with Figs. 6 and 7, the same length of cable is scaled as the cable is fed into the bore hole as is scaled as the cable is removed from the bore hole, it will then be apparent that forces during the two operations are substantially identical. However if a greater length of cable is scaled as the cable is removed from the bore hole, this indicates that the cable pull on the "in" measurement is different from the "out" measurement and should be compensated for by control of the position of carriage 113.

It will be further appreciated that measurements of the nature herein described in the calibration of well cables will be useful not only in connection with well logging operations but in assocation with completion practices and other operations which involve perforation of casings and the like by cable supported tools. Therefore, while specific embodiments of the invention have been illustrated and described, it will now be understood that further modifications will suggest themselves to those skilled in the art and it is intended to cover such modifications as fall within the scope of the appended claims.

What is claimed is:

1. In a system for scaling a well logging cable in which successive segments of said cable are scaled by spaced marking and sensing elements of a measuring station as said cable is moved past said measuring station, the combination therewith which comprises means responsive to dynamic variations in the tension on said cable adjacent said station for varying the distance between said elements only in dependence upon and in proportion to the instantaneous values of said tension, and means for registering the number of said segments on the cable passing said sensing element.

2. A system for scaling a well logging cable which comprises a condition generating means supported at a first point adjacent said cable for impressing distinctive localized conditions on said cable upon each energization of said generating means, a condition sensing means supported at a second point adjacent said cable spaced from said first point for sensing said localized conditions, circuit means interconnecting said condition sensing means and said condition generating means for actuating the latter in response to detection of said localized conditions by the former, and means responsive to dynamic variations in the tension on said cable adjacent said points for varying the spacing between said points in proportion to the instantaneous values of said tension, and means for indicating the number of said localized conditions on the cable passing said second point.

3. The combination set forth in claim 2 in which said condition generating means and said condition sensing means are supported by mechanical structure whose dimension between said points is independent of temperature.

4. The combination set forth in claim 2 in which said condition generating means and said condition sensing means each include magnetic structures which have an abutting relation to said cable highly restricted longitudinally of said cable and which extend over a substantial portion of the circumference of said cable.

5. In a system for measuring a well logging cable having a condition generating means at a first point adjacent said cable for impressing distinctive localized conditions on said cable and a condition sensing means at a second point spaced from said first point in the direction of movement of said cable for sensing said localized conditions, the combination therewith which comprises a rigid support for said generating and sensing means, a carriage for either said generating means or said sensing means movably mounted on said support, and means responsive to dynamic variations in the tension on said cable adjacent said points and operatively coupled to said carriage for varying the distance between said generating means and said sensing means only in dependence upon and in proportion to the instantaneous values of said tension whereby the number of said localized conditions passing said sensing means is uniquely indicative of the depth of the end of said cable in said bore hole.

6. In a system for measuring a well logging cable having a condition generating means at a first point adjacent said cable for impressing distinctive localized conditions on said cable and a condition sensing means at a second point spaced from said first point in the direction of movement of said cable for sensing said localized conditions, the combination therewith which comprises a rigid support for said generating and sensing means whose length is substantially independent of temperature, a carriage for either said generating means or said sensing means movably mounted on said support, and means responsive to dynamic variations in the tension on said cable adjacent said points and operatively coupled to said carriage for varying the distance between said generating means and said sensing means only in dependence upon and in proportion to the instantaneous values of said tension whereby the number of said localized conditions passing said sensing means is uniquely indicative of the depth of the end of said cable in said bore hole.

7. In a system for measuring a well logging cable in which a device is utilized to scale successive discrete portions of said cable as it moves past a measuring station adjacent the mouth of a well bore, the combination therewith which comprises adjusting means for varying said scaling device lengthwise of said cable to scale said cable in portions of variable length, a control circuit which includes a first impedance varied in one sense in dependence upon the tension of said cable at the mouth of said well bore, a second impedance varied in sense opposite to variations in said first impedance and in dependence upon the weight of said cable in said well bore, and a third impedance varied in sense opposite to variations in said first impedance and in proportion to variations in said scaling device, means responsive to said control circuit for actuating said adjusting means in dependence upon the impedance changes in said control circuit, and means for registering the number of said portions passing said measuring station.

8. A system for measuring the length of a well logging cable extending down a well bore which comprises a rigid support, a first transducer fixedly secured thereto at a first point along the travel path of said cable, a second transducer mounted for movement on said support adjacent a second point along the travel path of said cable, said transducers each having an abutting relation to said cable highly restricted longitudinally of said cable and extending over a substantial portion of the circumference of said cable, means for momentarily energizing said first transducer to impress a localized marker thereon whereby upon further movement of said cable said localized marker is detected by the second transducer, a circuit interconnecting said transducers for energizing the first transducer in response to said second transducer, a control circuit which includes a first impedance varied in one sense in dependence upon the tension of said cable at the mouth of said well bore, a second impedance varied in sense opposite to variations in said first impedance and in dependence upon the weight of said cable in said well bore, and a third impedance varied in sense opposite to variations in said first impedance and in proportion to variations in the position of the second of said transducers, means responsive to said control circuit for moving said second transducer, and means for registering the number of localized markers detected by said second transducer.

References Cited in the file of this patent

UNITED STATES PATENTS

| | | |
|---|---|---|
| 2,581,209 | Shepard et al. | Jan. 1, 1952 |
| 2,603,688 | Cole et al. | July 15, 1952 |